Aug. 1, 1961

D. WEIGHTON 2,994,843

CABLE EQUALISING CIRCUITS

Filed Sept. 17, 1956

Inventor
Donald Weighton
By
Holcombe, Wetherill & Brisebois
Attorneys

United States Patent Office 2,994,843

Patented Aug. 1, 1961

2,994,843

CABLE EQUALISING CIRCUITS

Donald Weighton, Cambridge, England, assignor to Pye Limited, Cambridge, England, a British company Filed Sept. 17, 1956, Ser. No. 610,283
Claims priority, application Great Britain Sept. 21, 1955
7 Claims. (Cl. 333—28)

Figure 1:
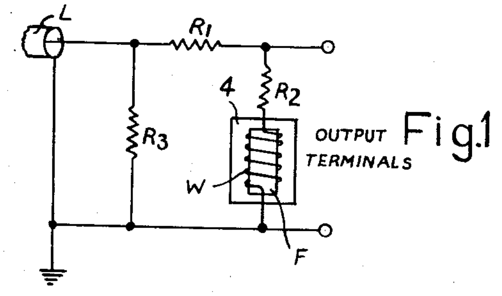

The present invention relates to cable equalising circuits, and more particularly to such circuits for use with cables employed for the transmission or distribution of high frequency signals, such as television signals.

In the distribution or transmission of high frequency signals, such as television signals, along cables, as for example in cables connecting television cameras to the amplifiers and other control equipment used in television transmission, a distortion of the signal is caused by the cable losses which attenuate the higher frequency components of the signal more than the low frequency components. In order to restore the original signal at the receiving end of the cable, it is necessary to use an equalising circuit to correct for the unequal attenuation of the cable.

A number of circuits have been proposed for achieving this object, all comprising arrangements of inductance, capacitance and resistance. One arrangement commonly used is that described in a paper entitled "A New Television Repeater for Telephone-Cable Circuits," by T. Kilvington, appearing in the British Post Office Electrical Engineers' Journal, 1949, No. 42, p. 76.

Now, the attenuation of cables rises over the major portion of the frequency range occupied by television signals in a manner proportional to the square root of the frequency. The insertion loss of an equaliser section made up of inductance, capacitance and resistance does not, however, vary in this manner, and a number of sections have to be used to obtain an approximation to the desired equaliser response. This leads to the use of complex networks containing large numbers of circuit elements for equalisation of cable lengths amounting to only a few hundred feet. In equipment such as television cameras which may have to operate at different times with different lengths of cable an even larger number of equalising networks has to be provided in order to allow selection by switching of the equalisation appropriate to the length of cable in use.

It is an object of the present invention to provide a means for equalising cables accurately with a simple network. It is a further object to provide means which allow the equalisation to be selected appropriate to the length of cable in use without the use of additional equalising sections.

According to the present invention, an equalising circuit incorporates a circuit element of a material having a high permeability and resistivity, these parameters being selected in such a manner that the resistance of the element rises with frequency in a manner similar to the attenuation of the cable to be corrected. The circuit element preferably comprises a length of a wire having the desired permeability and resistivity.

The invention therefore also consists in a cable equalising circuit comprising a circuit element comprising a length of wire of a material having a high permeability and resistivity, these parameters being selected in relation to the diameter of the wire in such a manner that due to the skin effect the resistance of the wire rises with frequency in a manner similar to the attenuation of the cable to be corrected. The required result may be achieved when the product of the square of the wire diameter and the permeability divided by the resistivity has the same value as that of the conductor in the cable. The wire is preferably supported on a former in a non-inductive manner.

Figure 2:
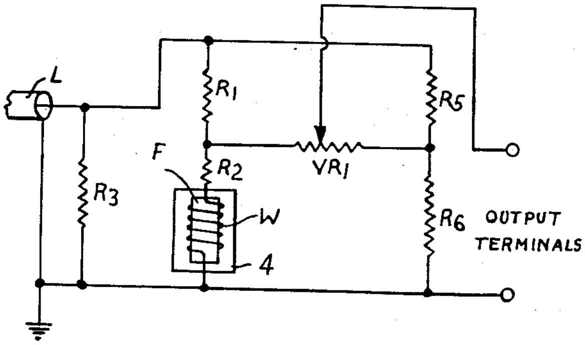
Figure 3:
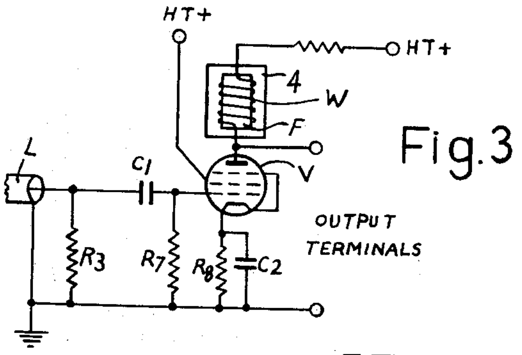
Figure 4:
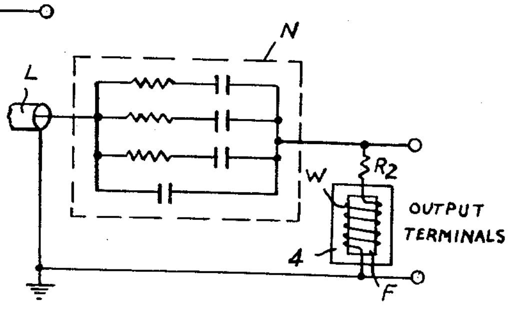

In order that the invention may be more fully understood, reference will now be made to the accompanying drawings, in which:

FIGURE 1 is a circuit diagram of one form of equalising circuit according to the invention, and FIGURES 2, 3 and 4 are respectively circuit diagrams of further embodiments of equalising circuit according to the invention.

Referring to FIGURE 1, the equalising circuit comprises resistors R1, R2 and R3 and a circuit element 4. Resistor R3 terminates the cable L to be equalised, and the circuit element 4 constitutes a wire of a material having a high permeability and resistivity, selected in relation to the diameter of the wire in such a manner that due to skin effect the resistance of the wire rises with frequency in a manner similar to the attenuation of the cable L. In one example of the invention, the circuit element 4 was constructed using 20 inches of "Mumetal" wire of .012" diameter wound in a noninductive fashion on a cylindrical former. The arrangement is shown diagrammatically by wire W wound on a former F. The resistors R1 and R2 had values of 270 ohms and 47 ohms respectively and the arrangement was found to compensate a length of 300 feet of cable having a loss of 4 decibels at 8 megacycles per second, to an accuracy of better than one centibel.

In the circuit arrangement shown in Figure 2, a potentiometer VR1 is provided for adjusting the equaliser circuit to suit the length of cable in use. Resistors R1, R2 and R3 and circuit element 4 are similar to the corresponding components in FIGURE 1.

Resistors R5 and R6 are chosen so that moving the slider of the potentiometer VR1 causes no change in the attenuation at low frequencies.

In the circuit of FIGURE 3, the cable L feeds into the grid of an amplifying valve V. The cable is terminated by resistor R3, and condenser C1 and resistor R7 form the coupling network to the control grid of the valve V. The anode load of the valve V includes the circuit element 4, according to this invention, for equalising the cable L. Resistor R8 and condenser C2 form the cathode bias network of the valve V.

The circuit of FIGURE 4 is somewhat similar to the circuit of FIGURE 1 but includes the resistance-capacity network enclosed within the broken line rectangle N to provide a terminating impedance for the cable L which impedance does not vary with frequency. This arrangement has the advantage of a lower insertion loss than the circuit of FIGURE 1.

Whilst particular embodiments have been described, it will be understood that various modifications may be made without departing from the scope of the invention. For example the wire may be made of other material besides "Mumetal."

I claim:

1. A cable equalising circuit for compensating for the attenuation characteristic of a cable carrying high frequency signals over at least one wire conductor and having an increasing amplitude attenuation characteristic with increase in frequency, said circuit having a pair of input terminals for connection to the cable, an electronic valve constituting an impedance and having at least a cathode, a grid and an anode, means for connecting one input terminal to the grid of said valve, a terminating impedance for the cable connected to the grid of said valve, means connecting the other input terminal to the cathode of said valve, a circuit element comprising a length of wire of a magnetic material having a high permeability and resistivity, these parameters being selected in relation to the diameter of the wire in such a manner that due to the skin effect the resistance of the wire rises with frequency in a manner similar to the attenuation of the cable to be corrected and so that the product of the square of the wire diameter and the permeability divided by the resistivity is substantially the same value as that of the at least one wire conductor in the cable to be corrected, means connecting said element to the anode of said valve, a resistor in series with said circuit element and an output terminal connected to the anode of said valve.

2. A cable equalising circuit for compensating for the attenuation characteristic of a cable carrying high frequency signals over at least one wire conductor and having an increasing amplitude attenuation characteristic with increase in frequency, said circuit having an input for connection to the cable to be equalised, a circuit element connected across said input and consisting of a length of wire of a magnetic material having a high permeability and resistivity, these parameters being selected in relation to the diameter of the wire in such a manner that due to the skin effect, the resistance of the wire rises with frequency in a manner similar to the attenuation of the cable to be corrected, and so that the product of the square of the wire diameter and the permeability divided by the resistivity is substantially the same value as that of the at least one wire conductor in the cable to be corrected, impedance means in series with said circuit element to increase the D.C. resistance of this branch of the network, an impedance through which an input signal is applied to the cable equalising circuit and a terminating impedance for the cable.

3. In a high frequency signal distribution system, a cable having at least one wire conductor for carrying said high frequency signals and having a signal amplitude attenuation characteristic which increases with frequency and an equalising circuit connected to said cable to compensate for said attenuation characteristic, said equalising circuit comprising a terminating impedance for the cable, a circuit element arranged in shunt with the signal path and consisting of a length of wire of a magnetic material having a high permeability and resistivity, these parameters being selected in relation to the diameter of the wire in such a manner that due to the skin effect, the resistance of the wire rises with frequency in a manner to compensate for the attenuation characteristic of the cable and so that the product of the square of the wire diameter and the permeability divided by the resistivity is the same value as that of the at least one wire conductor in the cable to be corrected, a resistor in series with said circuit element to increase the D.C. resistance of this branch of the network, an impedance which is high at the signal frequency through which a signal is applied to the equalising circuit and a further impedance connected across the cable presenting the correct terminating impedance to the cable.

4. A system as claimed in claim 3 in which the wire is supported on a former in a non-inductive manner.

5. In a high frequency signal distribution system, a cable having at least one wire conductor for carrying said high frequency signals and having a signal amplitude attenuation characteristic which increases with frequency and an equalising circuit connected to said cable to compensate for said attenuation characteristic, said equalising circuit comprising a circuit element connected across said input and consisting of a length of wire of a magnetic material having a high permeability and resistivity, these parameters being selected in relation to the diameter of the wire in such a manner that due to the skin effect, the resistance of the wire rises with frequency in a manner to compensate for the attenuation characteristic of the cable and so that the product of the square of the wire diameter and the permeability divided by the resistivity is substantially the same value as that of the at least one wire conductor in the cable to be corrected, impedance means in series with said circuit element to increase the D.C. resistance of this branch of the network, and an impedance through which an input signal is applied to the cable equalising circuit, said impedance including plural parallel branches each consisting of a resistor and a capacitor in series and also constituting a terminating impedance for the cable.

6. In a high frequency signal distribution system, a cable having at least one wire conductor for carrying said high frequency signals and having a signal amplitude attenuation characteristic which increases with frequency and an equalising circuit connected to said cable to compensate for said attenuation characteristic, said equalising circuit comprising a terminating impedance for the cable, a circuit element arranged in shunt with the signal path and consisting of a length of wire of a magnetic material having a high permeability and resistivity, these parameters being selected in relation to the diameter of the wire in such a manner that due to the skin effect, the resistance of the wire rises with frequency in a manner to compensate for the attenuation characteristic of the cable, and so that the product of the square of the wire diameter and the permeability divided by the resistivity is the same value as that of the at least one wire conductor in the cable to be corrected, a resistor in series with said circuit element to increase the D.C. resistance of this branch of the network, a first impedance which is high at the signal frequency through which a signal is applied to the equalising circuit, a second impedance connected across the cable presenting the correct terminating impedance to the cable, and an output connection from the junction of said resistor and said first impedance, said output connection including a variable resistor for adjusting the equalising circuit to suit the length of cable in use.

7. In a high frequency signal distribution system, a cable having at least one wire conductor for carrying said high frequency signals and having a signal amplitude attenuation characteristic which increases with frequency and an equalising circuit connected to said cable to compensate for said attenuation characteristic, said equalising circuit comprising an electronic valve having at least a cathode, a grid and an anode and constituting a high impedance feeding a circuit element connected to the anode of said valve, said circuit element comprising a length of wire of a magnetic material having a high permeability and resistivity, these parameters being selected in relation to the diameter of the wire in such a manner that due to the skin effect, the resistance of the wire rises with frequency in a manner to compensate for the attenuation characteristic of the cable, and so that the product of the square of the wire diameter and the permeability divided by the resistivity is substantially the same value as that of the at least one wire conductor in the cable to be corrected, a resistor connected in series with said circuit element, impedance means connected across said cable for presenting the correct terminating impedance to said cable, and an output terminal connected to the anode of said valve.

References Cited in the file of this patent

UNITED STATES PATENTS

| | | |
|---|---|---|
| 1,761,110 | Dijksterhuis | June 3, 1930 |
| 1,768,248 | Green | June 24, 1930 |
| 1,815,255 | Hoyt | July 21, 1931 |
| 1,984,526 | Given | Dec. 18, 1934 |
| 2,151,715 | Peters | Mar. 28, 1939 |
| 2,238,915 | Peters et al. | Apr. 22, 1941 |
| 2,594,890 | Ellwood | Apr. 29, 1952 |
| 2,668,883 | Hurford | Feb. 9, 1954 |
| 2,692,372 | Goldstine | Oct. 19, 1954 |
| 2,787,656 | Raisbeck | Apr. 2, 1957 |